Dec. 6, 1949  G. SWAHNBERG  2,490,173
BLADE OSCILLATING AND DRIVING
MECHANISM FOR LAWN MOWERS
Filed April 21, 1945  2 Sheets-Sheet 2
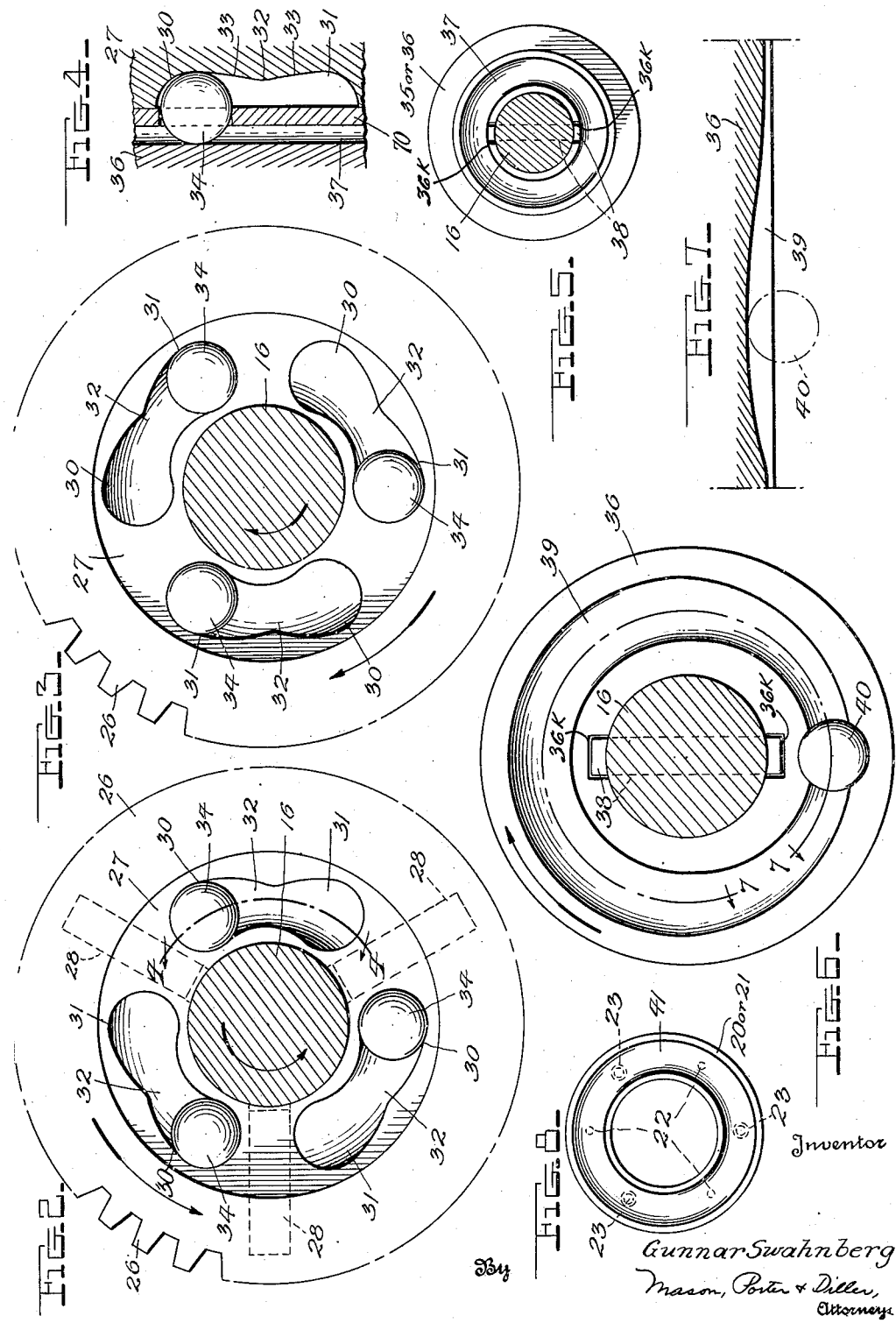
Inventor
Gunnar Swahnberg
By Mason, Porter & Diller,
Attorneys Patented Dec. 6, 1949

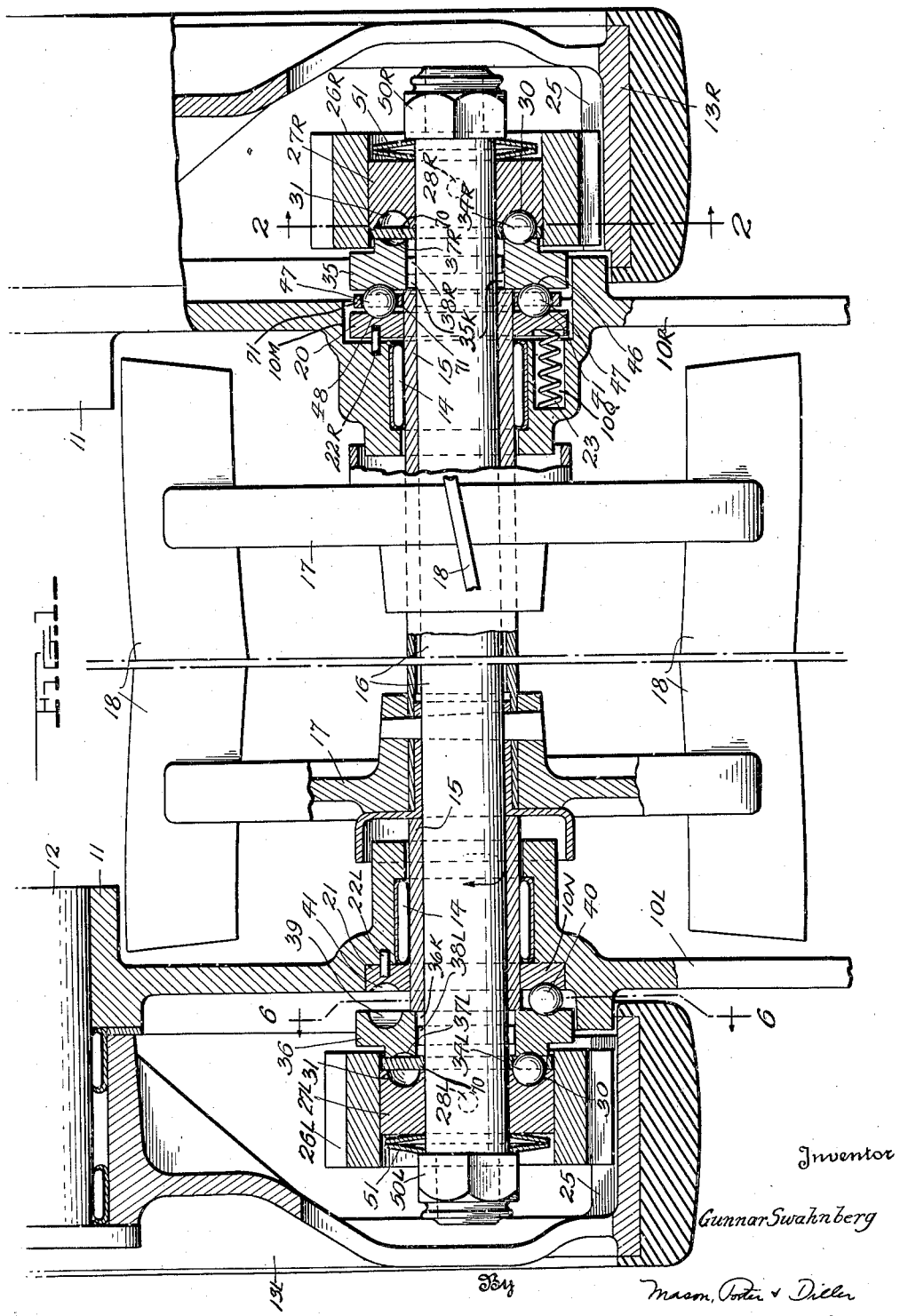

2,490,173

UNITED STATES PATENT OFFICE 2,490,173

BLADE OSCILLATING AND DRIVING MECHANISM FOR LAWN MOWERS

Gunnar Swahnberg, Keene, N. H.

Application April 21, 1945, Serial No. 589,580

5 Claims. (Cl. 56—249)

This invention concerns a mechanism for driving and axially oscillating the rotating blades of a lawn mower or like cutting device.

A feature of the invention is the provision of a driving system wherein the cage of rotating blades is driven through an overrunning clutch which, during normal use, permits the usual retrograde movement of the body structure without turning of the cage, which permits a release upon overloading whereby to prevent damage to the structures, and which produces axial reciprocation of the cage during cutting.

Another feature is the provision of a driving system wherein the cage can be driven from both ends in normal straight-away cutting, through over-running clutches, and in which several elements are identical in form at the two ends so that no selection between "rights" and "lefts" is necessary in the assembly.

With these and other features as objects in view as will appear in the course of the description and claims, an illustrative form of practice is shown in the accompanying drawings, in which:

Figure 1 is a section, for the major part in a radial plane through the cage axis of a lawn mower with central parts broken away.

Figure 2 is a detail view, on a larger scale, showing a drive bushing and drive elements essentially on line 2—2 of Fig. 1, but omitting the ground wheel.

Figure 3 is a view corresponding to Figure 2, but with the parts in a different position.

Figure 4 is a section through clutch elements, essentially on line 4—4 of Fig. 2.

Figure 5 is a face view of the clutch ball race on the scale of Fig. 1.

Figure 6 is a face view of the oscillation-producing cam on the scale of Fig. 2.

Figure 7 is an unwrapped section, taken through the floor of the groove in the oscillation-producing cam and substantially on the surface indicated by arc 7—7 in Fig. 6, but on a smaller scale.

Figure 8 is a face view of an oscillator ball race on the scale of Fig. 1.

In the drawings, a lawn mower is illustrated as having a frame including the side members 10R, 10L having bosses 11 in which are the pivots 12 for the ground wheels 13R, 13L. The side members 10R, 10L also carry antifriction bearings 14 for the bushings 15 mounted on the cage shaft 16, upon which in turn are secured the cage spiders 17 for mounting the rotating knives 18. It will be understood that large central portions of the shaft 16, bushings 15, and of the conventionalized rotating knives 18 have been omitted in Fig. 1, in order to show the cooperating parts of the invention on a large scale. In the illustrated form, each rotating knife has the form of two helices, each extending from an end to the center of length of the cage, with opposite pitches and so directed that each portion acts to throw the clippings toward the center of the swath being cut.

Oscillator ball races 20, 21 are supported against rotation relative to the side members 10R, 10L, preferably being received in pockets 10M, 10N of these members and may be held against angular movement by the dowel pins 22R, 22L although the torque upon these races is so low that good fitting is normally sufficient. The race 20 is free to slide axially on the bushing 15, and is urged toward the adjacent end of the shaft 16 by springs 23, as shown in Figs. 1 and 8, which are contained in recesses 10Q of the corresponding side member 10R and react against this side member at the bottoms of the recesses. The race 21 is the same in form, but does not have the associated springs 23.

The ground wheels 13R, 13L are provided with internal gear teeth 25 which mesh with the drive pinions 26R, 26L. These pinions have large central bores for receiving the bushings 27R, 27L. These pinions, bushings and pins are shown as identical in shape and sizes and are shown as pinion 26, bushing 27 and pins 28 in Figs. 2 and 3. Driving pins 28 are tightly fitted in holes of the bushings and of the pinions (Figs. 1 and 2) so that each bushing must turn with its corresponding pinion, but each bushing is free for rotation around the shaft 16 which it embraces. The inward face of each bushing, or that turned away from the adjacent end of the shaft 16, is provided with arcuate grooves which are of limited peripheral length and are illustrated as three in number in Figs. 2 and 3. Each of these arcuate grooves has deep portions 30, 31 at its ends, and a shallow portion 32 at its center, so that the floor 33 of the groove (Fig. 4) slopes from the ends toward the center of the length, with the end face and its grooves symmetrically arranged, and each arcuate groove being generally of dumb-bell shape. Each of the grooves has a torque-transmitting element, illustrated as a ball 34R or 34L in Fig. 1, therein, being shown as balls 34 in Figs. 2 and 3.

Each of the rings 35, 35 has (Fig. 5) in its outer face, alined with the arcuate grooves, a concentric uniform groove 37R or 37L for engaging the balls 34R, 34L. Each of these rings fits the shaft 16 and bears against the adjacent bushing 15, and has keyways 35K or 36K for slidingly receiving the ends of the driving pin 38R or 38L (shown as keyways 36K and pin 38 in Figs. 5 and 6) which passes through the shaft 16; so that the ring must turn with the shaft but can move axially relative thereto. The inner face of the ring 36 has a concentric groove 39 which is of varying depth (Figs. 1, 6 and 7), that is, it presents portions lying in different radial planes and receives a ball 40 which can roll along the groove as the shaft turns in the side members of the frame, while the ball also travels in the groove 41 of the oscillator ball race 21.

The ring 35 is provided with a concentric groove 37R (shown as groove 37 in Fig. 5) on the outer face for engaging the balls 34R of the arcuate grooves in the adjacent bushing 27R, and with a concentric groove 46 on its inner face for engaging the balls 47 which also engage the groove 48 of the ball race 20. The grooves 46 and 48 are of uniform cross-section so that the parts 20, 47, 35 operate in this illustrative form as a spring-pressed antifriction thrust bearing.

Nuts 50R, 50L are threaded onto the ends of the shaft 16 and serve as outboard or end abutments for the dished spring washers 51 which act to cause the bushings 27 to move inward on the shaft.

In operation, the clutch parts will be assumed to be in the position illustrated by Fig. 2 with the balls 34 in the deep ends 30 of the arcuate grooves. As the lawn mower is trundled forward in normal mowing, the ground wheels 13R, 13L rotate and the pinion 26 of Fig. 2 is driven in the direction shown by the arrow, and therewith the bushing 27. At starting, the cage assembly is at rest, and its drag causes the balls 34 to be rolled from the deep ends 30 of the arcuate grooves toward the shallow central parts 32, therewith wedging the parts 27, 36 apart for a distance limited by the washers 51.

The rings 35, 36 each bear against the bushings 15 and are thus held a fixed axial distance apart on the shaft 16. The ring 36 bears against the balls 34 and these in turn press against the bottoms of the grooves in the bushing 27L so that the adjacent washer 51 is stressed against the adjacent end abutment 50L. At the other, or right-hand end in Fig. 1, the ring 35 bears against the balls 34R with similar transmission of stress by washer 51 to the adjacent abutment 50R. As the balls 34 travel in their grooves, the transmitted torque increases with the stress in the washers 51 until the torque is sufficient to cause rotation of the shaft 16 and its associated parts such as the knives 18, and the normal cutting action occurs. That is, each bushing 27R, 27L is forced relatively away from the adjacent ring 35, 36 against the action of the corresponding spring washer 51. If the cutting load becomes greater, the balls 34 travel farther with a greater wedging effect and a greater reaction force by the springs, until equilibrium is again established. In the event the mower blades encounter an obstacle such as a branch, stone, etc., the load increases beyond normal, and this overload causes further travel of the balls 34 until they pass the shallow points 32 and go to the deep ends 31 of the arcuate grooves in which the torque transmission is no longer able to rotate the cage, and the latter stops so that the knives and other parts are saved from damage although the ground wheels can continue to rotate as they travel. This overload-released condition continues until resetting; resetting can be effected by blocking the cage against retrograde rotation and turning the ground wheels backward so that the overload condition occurs in the reverse direction and the balls 34 are caused to travel from the deep ends 31 to the opposite deep ends 30, whereupon the mower is ready again for the normal cutting operation.

When the lawn mower is cutting a curved swath, the ground wheel which travels the greater distance acts through its pinion to control the driving of the shaft 16, and this shaft overruns the other pinion. In doing so, the ring 35 or 36 adjacent this other pinion likewise overruns the corresponding bushing 27 and the balls 34 move to the deep ends 30 at which this clutch acts as an over-running clutch.

The structure also causes the cage to oscillate axially. This is accomplished by the action of the ball 40 in its confining grooves 39, 41 in the ring 36 and race 21, and of the return springs 23. The shaft 16 with the cutting blades 18 keyed thereto, together with the end nuts 50, the races 35, 36 and the bushings 15 turn and move axially as a unit. The pinion assemblies 26—27 can turn relative to the shaft and move therealong under the conditions established by the spring washers 51 and the arcuate grooves as aforesaid; each of the washers 51 has a greater spring effort than that exerted by the springs 23, so that during the axial oscillations, the several parts turn and move axially essentially as a unit with the shaft 16. As the shaft 16 and ring 36 turn, the ball 40 rolls in its grooves at half the rotational speed of the shaft, and therewith passes along the deeper and shallower parts of the groove 39 in cyclic succession so that when the ball approaches a shallower part of the groove 39, the ring 36 is moved toward the left in Fig. 1 and thereby acts through balls 34L, bushing 27L, spring 51, against the abutment 50L and causes the shaft 16 to move toward the left and therewith carry the cage with it. This movement causes the abutment nut 50R at the right-hand end of the shaft to press the spring 51, bushing 27R, balls 34R, ring 35, balls 47 and race 20 toward the left against the action of the springs 23 and into the position shown in Fig. 1. When the ball 40 passes into a deeper part of the groove 39, a reverse axial movement of the shaft and cage occurs under the action of the springs 23.

This oscillating motion is of particular value during grinding of the blades. For grinding, the cage is purposely blocked while the ground wheels are turned, so that the balls 34 are brought to the ends 31 of the arcuate grooves as described above. A fluid grinding compound is applied to the stationary blade. The mower is turned upside down so the stationary blade is above the cage, and then is pushed along the ground. Owing to the reversal of action of the overrunning clutches, the ground wheels cause the cage to rotate with a retrograde motion and with an axial oscillation by the described action. The compound flows slowly down and the cutting edges are sharpened and fitted to one another.

The groove 39 can have a minimum depth of one-sixteenth inch and a maximum of five thirty-seconds, giving an axial movement of about three thirty-seconds of an inch. As shown in Fig. 7, the center of the floor of the groove can have a harmonic curvature so that there is an accelerating motion as the movement brings the cage toward mid-stroke, and then a decelerating motion to the end of the stroke; with an oscillation cycle for each two full revolutions of the cage.

Upon completing the grinding, the overload clutches are reset for forward motion in the manner described above, and grass cutting can be done.

Separating washers 70 and 71 are shown, for assuring the regular movement of the balls 34 and 47.

The preferred form as shown and described is illustrative, and it will be understood that the invention can be employed in other ways within the scope of the appended claims.

I claim:

1. A lawn mower having a frame, a knife-supporting shaft journalled to rotate and move axially in the frame, said frame having a concentric oscillator race groove thereon, a ring rotated with the shaft and having a concentric ring groove, one of said grooves having deep and shallow portions, a ball in said grooves, the ball being effective during the rotation of the shaft to travel along said grooves and therewith cause axial movement of the shaft in one direction, and means for moving the shaft in the other axial direction.

2. A lawn mower having a frame, a knife-supporting shaft journalled to rotate and move axially in the frame, said shaft having axially spaced rings mounted thereon and rotatable therewith, said rings being located on opposite sides of the frame, spring means effective between one said ring and the frame for causing the shaft to move in one axial direction, and means cooperating wtih the other said ring and with the frame for causing the shaft to move in the other axial direction.

3. A lawn mower having a frame, ground wheels, a knife-supporting shaft journalled to rotate and move axially in the frame and having an abutment at each end, means whereby the ground wheels individually impart rotative forces to the shaft and including overload clutches each having a first member concentric with the shaft and a spring effective between said first member and one of said abutments; and an oscillator structure for imparting axial oscillation to said shaft and including axially spaced second members concentric with the shaft and supported against movement relative to the frame, each said second member being located adjacent a said first member, one of said members being formed with a groove concentric with the shaft and having deep and shallow portions, a ball in said groove and engaging the said adjacent member whereby to provoke axial movement of the shaft in one direction, and resilient means engaged with the frame and effective through one said overload clutch to press a shaft abutment and thereby move the shaft in the other axial direction.

4. A lawn mower having a frame, a knife-supporting shaft journalled to rotate and move axially in the frame, a rotating knife carried by said shaft, and means effective to move the shaft with a continuous cyclic axial movement during the course of its rotation, said means including a spring reacting against the frame for urging the shaft in one axial direction and also including a first part carried in rotation with the shaft and a second part carried by the frame and having portions cooperating with the first part to cause movement of the shaft in the opposite axial direction, one of said parts having its cooperating portions in different radial planes.

5. A lawn mower having a frame, a knife-supporting shaft journalled therein, and a rotating knife carried by said shaft, the combination therewith of a first part carried in rotation by the shaft, a second part carried by the frame and held against rotation, one said part having a portion concentric with the shaft and located in different radial planes, and an element engaged with said portion and with the other said part for transmitting axial forces between said parts as said member passes from one said radial plane to another said radial plane.

GUNNAR SWAHNBERG.

REFERENCES CITED

The following references are of record in the file of this patent:

UNITED STATES PATENTS

| Number | Name | Date |
|---|---|---|
| 944,712 | Berens | Dec. 28, 1909 |
| 1,159,691 | Lindstrom | Nov. 9, 1915 |
| 1,452,730 | Dremel | Apr. 24, 1923 |
| 1,751,054 | Peel | Mar. 18, 1930 |
| 1,849,868 | Einstein | Mar. 15, 1932 |
| 1,876,169 | Riemenschneider | Sept. 6, 1932 |
| 2,363,975 | Kline et al. | Nov. 28, 1944 |